United States Patent
Inoue

(10) Patent No.: US 7,123,813 B2
(45) Date of Patent: Oct. 17, 2006

(54) TELEVISION SIGNAL RECEIVER, AND METHOD FOR CONTROLLING RECORDING OF TELEVISION SIGNALS

(75) Inventor: Kenji Inoue, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 798 days.

(21) Appl. No.: 09/883,310

(22) Filed: Jun. 19, 2001

(65) Prior Publication Data

US 2001/0055465 A1 Dec. 27, 2001

(30) Foreign Application Priority Data

Jun. 27, 2000 (JP) .............................. 2000-192780

(51) Int. Cl.
*H04N 5/91* (2006.01)
*H04N 5/50* (2006.01)
*H04N 5/44* (2006.01)

(52) U.S. Cl. ............................ 386/46; 386/83; 386/95; 386/55; 386/96; 348/731; 348/734

(58) Field of Classification Search .................. 386/46, 386/83, 95, 55, 96; 345/723; 348/731, 734; H04N 5/91, H04N 5/50, 5/44

See application file for complete search history.

(56) References Cited

U.S. PATENT DOCUMENTS

| 5,388,197 | A | * | 2/1995 | Rayner ........................ 715/723 |
| 5,850,218 | A | * | 12/1998 | LaJoie et al. .................. 725/45 |
| 5,926,607 | A | * | 7/1999 | Oguro et al. .................. 386/95 |
| 6,035,091 | A | * | 3/2000 | Kazo ............................ 386/46 |
| 6,118,925 | A | * | 9/2000 | Murata et al. ................. 386/83 |
| 6,311,011 | B1 | * | 10/2001 | Kuroda ......................... 386/46 |
| 6,353,444 | B1 | * | 3/2002 | Katta et al. .................. 345/716 |
| 2001/0012447 | A1 | * | 8/2001 | Horiguchi et al. .......... 386/125 |

* cited by examiner

*Primary Examiner*—Thai Tran
*Assistant Examiner*—Jamie Vent
(74) *Attorney, Agent, or Firm*—Fitzpatrick, Cella, Harper & Scinto

(57) ABSTRACT

A television signal receiver is connected to a plurality of recording apparatuses, and controls each of the plurality of recording apparatuses so as to record program data received by the television signal receiver. The television signal receiver includes an input unit for inputting program data, an identification unit for identifying a group to which the program data inputted by the input unit belongs, a selection unit for selecting a recording apparatus from among the plurality of recording apparatuses in accordance with the group identified by the identification unit, and an output unit for outputting the program data to the recording apparatus selected by the selection unit.

15 Claims, 6 Drawing Sheets

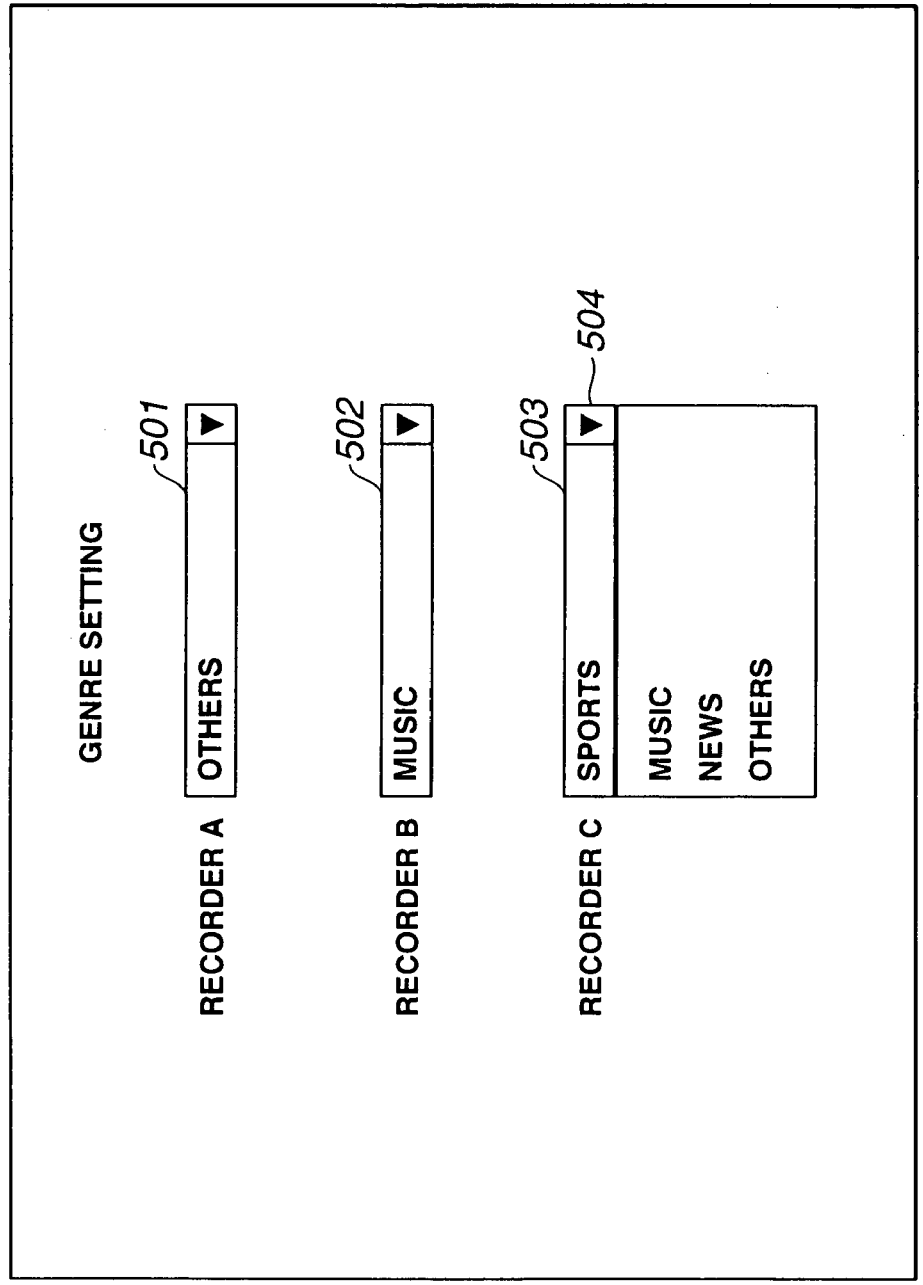

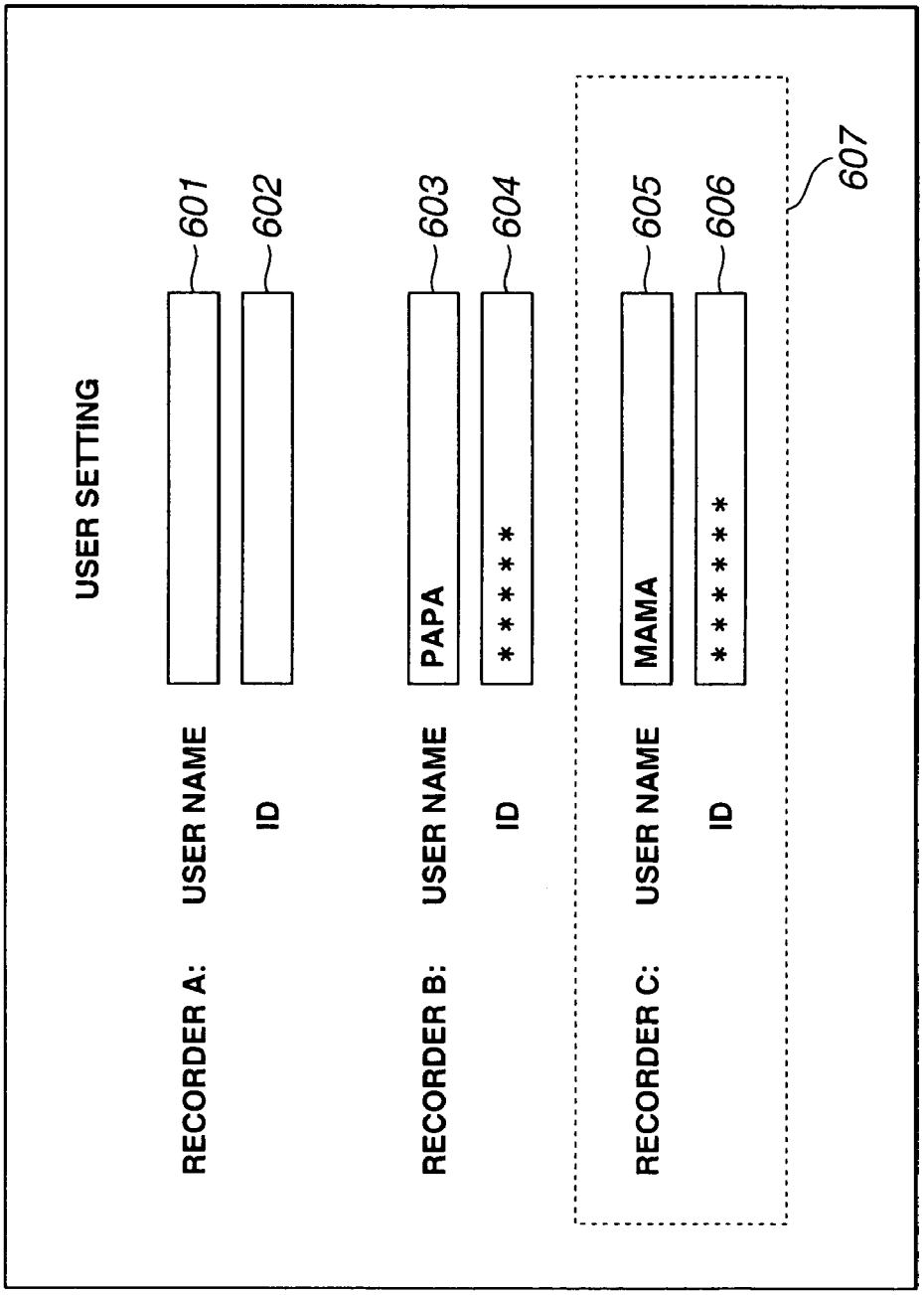

TELEVISION SIGNAL RECEIVER, AND METHOD FOR CONTROLLING RECORDING OF TELEVISION SIGNALS

BACKGROUND OF THE INVENTION

1. Field of the Invention

The present invention relates to a controller for controlling a recording operation, and more particularly, to a controller for controlling data recording of a digital TV broadcast.

2. Description of the Related Art

Recently, video systems are being digitalized. For example, a system for recording image data and sound data in a digital VCR (video cassette recorder), a HDD (hard-disk drive), or a recording medium, such as a CD(compact disc)-RW (rewritable), or the like, is known.

Broadcasting systems, such as currently realized digital satellite TV broadcasts using a communication satellite (CS), digital satellite TV broadcasts using a broadcasting satellite (BS), and ground-wave digital TV broadcasts, and the like, are also being digitalized.

In such digital TV broadcasts, program data is transmitted after being compressed using a compression method, such as the MPEG(Moving Picture Experts Group)2 method or the like. Hence, when recording program data, it is possible to record the program data in a compressed state, so that many programs can be recorded in a recording apparatus, such as a HDD or the like in the above-described manner. Furthermore, since many programs of various types are transmitted as digital TV broadcasts, the number of programs recorded by a user increases, and program data relating to a plurality of programs of digital TV broadcasts may be recorded in a plurality of recording apparatuses.

However, in conventional program recording systems, when recording program data relating to a plurality of programs in a plurality of recording apparatuses, the user assigns a recording apparatus where program data is to be recorded, without clearly recognizing the state of the recording apparatus, such as the contents and the recording position of program data recorded in a recording medium, the recordable capacity of the recording medium, and the like.

Accordingly, a troublesome operation for searching for a recordable region may be required, and the recording region of the recording medium may not be efficiently used when recording program data.

In conventional program recording systems in which program data relating to a plurality of programs are recorded in a plurality of recording apparatuses, program data having various contents are recorded in each recording apparatus, and when a plurality of users share a system, program data recorded by respective users are mixed.

Accordingly, when reproducing program data, a troublesome operation for retrieving desired program data from among recorded program data may be required, and, for example, program data recorded by a user can be unintentionally reproduced or deleted by another user.

SUMMARY OF THE INVENTION

It is an object of the present invention to solve the above-described problems.

It is another object of the present invention to efficiently manage recorded programs when recording program data relating to a plurality of programs in a plurality of recording apparatuses.

It is still another object of the present invention to allow, when recording program data relating to a plurality of programs in a plurality of recording apparatuses, an optimum recording region to be easily found for recording the program data, and to efficiently use recording regions of a recording medium.

It is yet another object of the present invention to allow a user to easily retrieve desired program data from among a plurality of recorded program data when reproducing program data from each of a plurality of recording apparatuses.

It is yet a further object of the present invention to allow each user to perform processing, such as reproduction, deletion, or the like, of program data, when program data are recorded in a plurality of recording apparatuses and a plurality of users use a common program recording system.

According to one aspect, the present invention achieves the above objectives with a television signal receiver connected to a plurality of recording apparatuses, each of which records program data received by the television signal receiver. The television signal receiver includes an input unit for inputting program data, an identification unit for identifying a group to which the program data input by the input unit belongs, a selection unit for selecting a recording apparatus from among the plurality of recording apparatuses in accordance with the group identified by the identification unit, and an output unit for outputting the program data to the recording apparatus selected by the selection unit.

According to another aspect, the present invention achieves the above objectives with a recording control method of controlling a plurality of recording apparatuses, each of which records program data received by a television signal receiver. The method includes an input step of inputting program data, an identification step of identifying a group to which the inputted program data belongs, a selection step of selecting a recording apparatus from among the plurality of recording apparatuses in accordance with the identified group, and an output step of outputting the program data to the selected recording apparatus.

According to still another aspect, the present invention achieves the above objectives with a television signal receiver connected to a plurality of recording apparatuses, each of which records program data received by the television signal receiver. The television signal receiver includes a setting unit for setting user information for each of the plurality of recording apparatuses, and a control unit for controlling each of the plurality of recording apparatuses so as to allow a user corresponding to the user information set by the setting unit to instruct processing relating to an identified recording apparatus.

According to yet another aspect, the present invention achieves the above objectives with a recording control method of controlling a plurality of recording apparatuses, each of which records program data received by a television signal receiver. The method includes a setting step of setting user information for each of the plurality of recording apparatuses, and a control step of controlling each of the plurality of recording apparatuses so as to allow a user corresponding to the user information set in the setting step to instruct processing relating to an identified recording apparatus.

The foregoing and other objects, advantages, and features of the present invention will become more apparent from the following detailed description of the preferred embodiments taken in conjunction with the accompanying drawings.

BRIEF DESCRIPTION OF THE DRAWINGS

FIG. 5 is a diagram illustrating a picture frame for setting a genre according to a second embodiment of the present invention; and FIG. 6 is a diagram illustrating a user-setting picture frame according to a third embodiment of the present invention.

DETAILED DESCRIPTION OF THE PREFERRED EMBODIMENTS

Preferred embodiments of the present invention will now be described with reference to the drawings.

Figure 1:
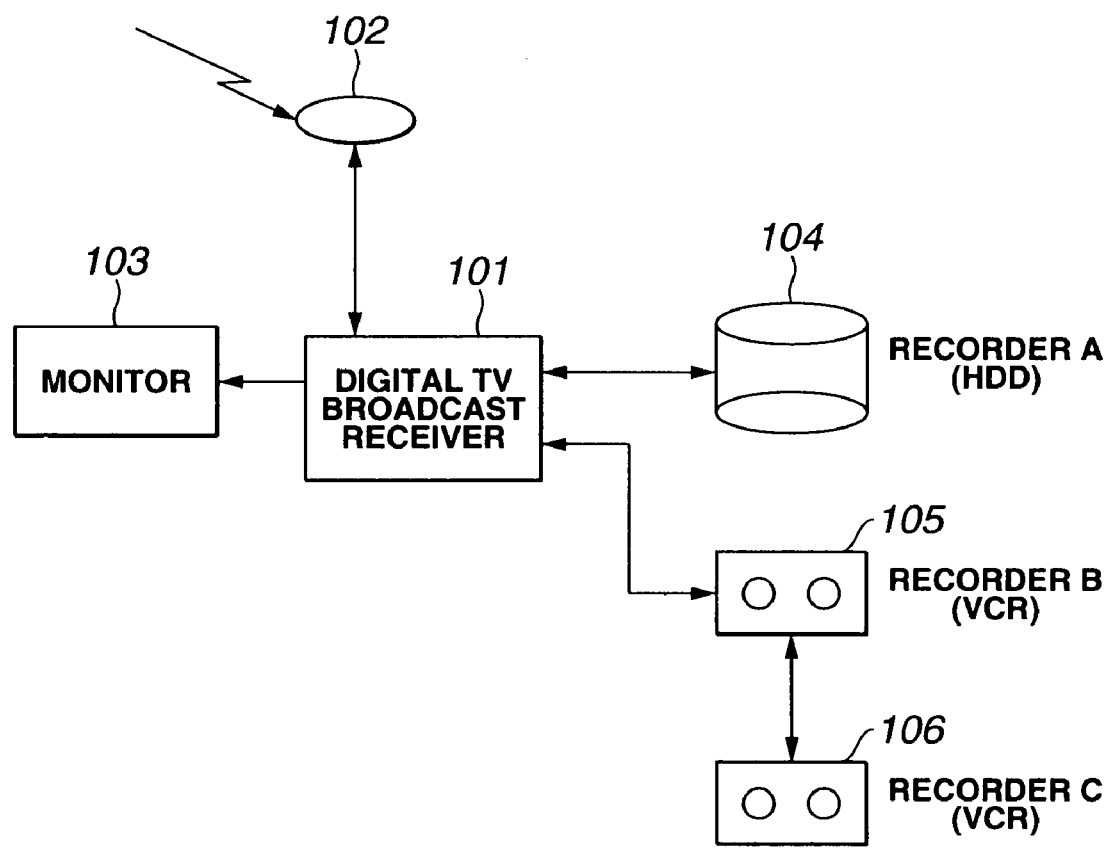
FIG. 1 is a diagram schematically illustrating a configuration of a program recording system according to a first embodiment of the present invention.

First, a first embodiment of the present invention will be described. FIG. 1 is a diagram illustrating the configuration of a program data recording/reproducing system according to the first embodiment.

In FIG. 1, a digital TV broadcast receiver 101 is connected to an antenna 102, a monitor 103, a recording apparatus A 104, and a recording apparatus B 105 via bus lines, such as IEEE SP 1394 bus lines, or the like. In this example, it is assumed that the recording apparatus A 104 is a HDD, and the recording apparatus B 105 and recording apparatus C 106 are VCRs.

Program data of digital TV broadcasts received via the antenna 102 is input to the digital TV broadcast receiver 101, and is output to the monitor 103, the recording apparatus A 104 and the recording apparatus B 105 after being subjected to signal processing and the like, as will be described later. The monitor 103 displays images relating to image data of the corresponding program based on the inputted program data, and outputs sound data of the program.

The recording apparatus A 104, the recording apparatus B 105, and the recording apparatus C 106 record/reproduce inputted program data based on instructions from the digital TV broadcast receiver 101. The recording apparatus C 106 performs processing, such as recording/reproducing of program data, via a bus line, such as an IEEE 1394 bus line, or the like, connecting the recording apparatus C 106 to the recording apparatus B 105.

Figure 2:
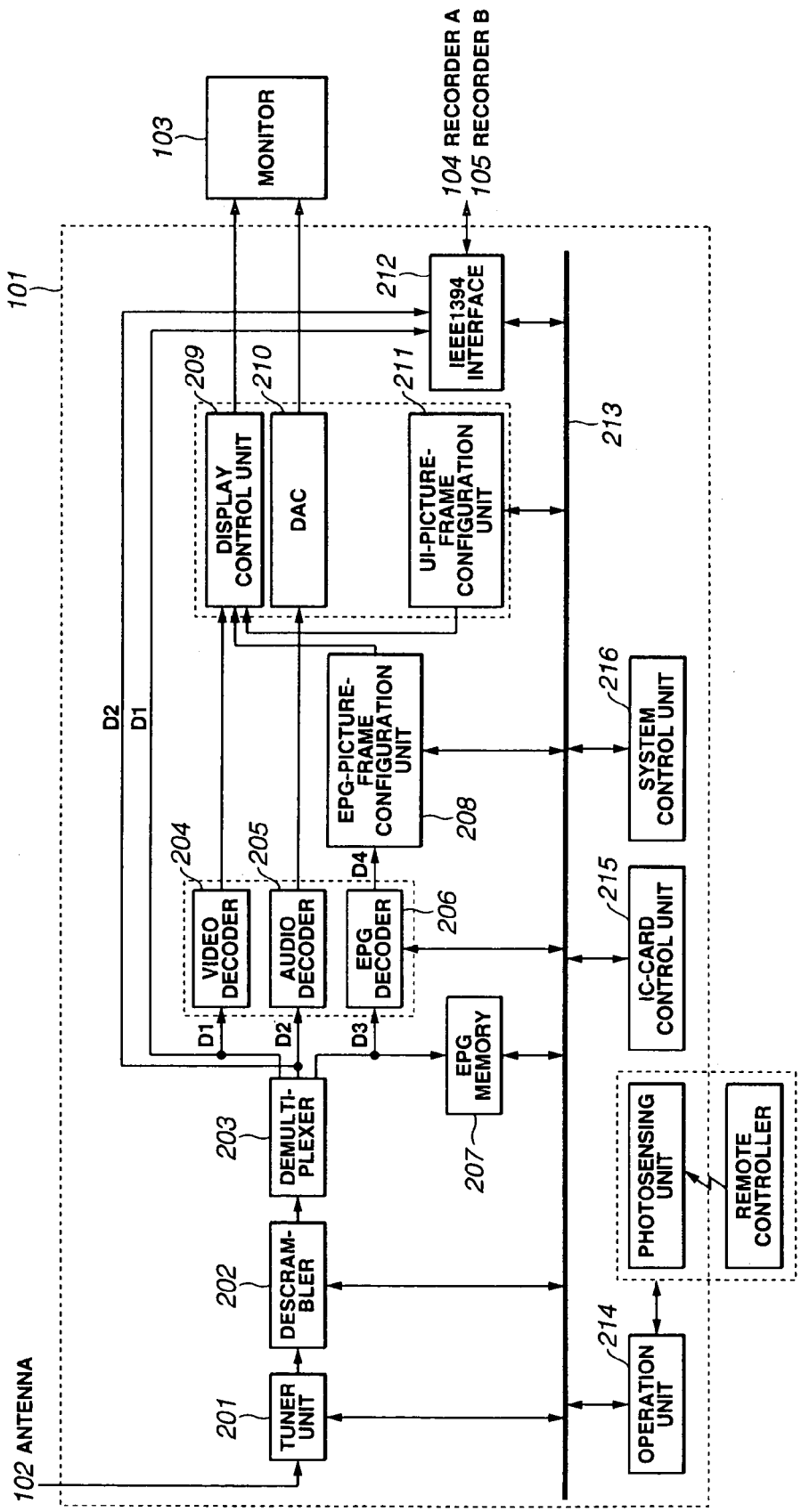
FIG. 2 is a block diagram schematically illustrating a configuration of a digital TV broadcast receiver in the program recording system shown in FIG. 1.

FIG. 2 is a diagram illustrating a configuration of the digital TV broadcast receiver 101 shown in FIG. 1.

In FIG. 2, a signal received by the antenna 102 or a cable (not shown) is input to a tuner unit 201. The tuner unit 201 performs processing, such as demodulation, error correction, or the like, for the inputted signal to generate digital data in a form called a transport stream. The generated transport stream (TS) data is output to a descrambler 202.

When the TS data scrambled for the purpose of restriction of viewing is input from the tuner unit 201, the descrambler 20 performs descrambling based on descrambling key information contained in the TS data and key information output from an IC-card control unit 215, and outputs descrambled data to a demultiplexer 203.

The IC-card control unit 215 includes an IC card storing contract information relating to the digital TV broadcast receiver's owner (user), and key information for solving the descrambling key information contained in the TS data. When there is key information for solving the descrambling key information input from the decrambler 202, that key information is output to the descrambler 202.

When unscrambled TS data is input from the tuner unit 201, the descrambler 202 outputs the inputted TS data to the demultiplexer 203 without modifying the data.

The demultiplexer 203 extracts image data D1 and sound data D2 relating to the currently broadcasted program in a channel selected by the user's operation on an operation unit 214 from the TS data in which image data, sound data, EPG (electronic program guide) data and the like for a plurality of channels inputted from the descrambler 202 are subjected to time-division multiplexing, and outputs the image data D1 and the sound data D2 to a video decoder 204 and an audio decoder 205, respectively. The operation unit 214 includes a remote controller and a photosensing unit, in addition to an operation portion provided at the main body of the receiver 101.

The demultiplexer 203 also extracts EPG data D3 from the above-described TS data, and outputs the extracted EPG data D3 to an EPG decoder 206 and an EPG memory 207. The EPG memory 207 stores the EPG data D3 from the demultiplexer 203.

EPG data is periodically received by the tuner unit 201, and is always used to periodically update the latest EPG data in the EPG memory 207. In addition, EPG data is received in accordance with an instruction to receive EPG data by operation on the operation unit 214 by the user, and the received EPG data is stored in the EPG memory 207.

TS data is transmitted in units of packets, and PID (packet identification) is added at a head portion of a packet. The demultiplexer 203 identifies the image data D1, the sound data D2 and the EPG data D3 by reading the PID.

As shown in FIG. 2, respective blocks of the receiver 101 are connected to a common bus 213.

First, image data will be described. The video decoder 204 performs decoding processing conforming to the MPEG2 Standard for image data inputted from the demultiplexer 203, and outputs decoded image data to a display control unit 209.

The display control unit 209 outputs image data inputted from the video decoder 204, an EPG-picture-frame configuration unit 208, and a UI-picture-frame configuration unit 211 to the monitor 103, so as to display images relating to the image data by switching or multiplexing picture frames in accordance with the user's operation on the operation unit 214.

The UI-picture-frame configuration unit 211 forms, for example, a picture frame in accordance with the user's operation on the operation unit 214, and outputs the formed picture frame to the display control unit 209. The EPG-picture-frame configuration unit 208 will be described later.

Next, sound data will be described. The audio decoder 205 performs MPEG2-decoding processing for the sound data D2 inputted from the demultiplexer 203, and outputs decoded sound data to a DAC (digital-to-analog converter) 210. The DAC 210 performs D/A conversion processing for the sound data inputted from the audio decoder 205, and outputs the resultant data to the monitor 103.

Next, EPG data will be described. Data necessary for configuring EPGs is transmitted in a data structure provided, for example, by "IEC13818-1 MPEG2 SYSTEM" standards or "program display information used in digital broadcast" established by the Association of Radio Industries and Businesses (ARIB). Main configuration data includes an SDT (service description table) for transmitting information relating to organization channels, such as the name of each organization channel, the name of each broadcast entrepreneur, and the like, a BAT (bouquet association table) for transmitting information relating to a bouquet (a set of organization channels), such as the name of the bouquet, included organization channels, and the like, an EIT (event information table) for transmitting information relating to programs, such as the name of each program, the broadcast time and date, description of contents, and the like, a TDT (time date table) for transmitting information relating to the current date and time, and the like.

When an operation for displaying EPGs has been performed on the operation unit 214, an instruction to display the EPGs from the operation unit 214 is input to a system control unit 216.

When the instruction to display the EPGs has been input from the operation unit 214, the system control unit 216 reads necessary information from the EPG memory 207, and outputs the read information to an EPG decoder 206. The EPG decoder 206 performs decoding processing for the EPG data D3, and outputs decoded EPG data D4 to the EPG-picture-frame configuration unit 208.

The EPG-picture-frame configuration unit 208 generates various signals, such as a character signal for configuring an EPG picture frame (not shown), and the like, based on the EPG data D4 inputted from the EPG decoder 206 and a control signal from the system control unit 216, and outputs the generated signals to the display control unit 209. The display control unit 209 outputs an image signal to the monitor 103 in order to perform switching of a display of an image picture frame, an EPG picture frame, and the like.

The system control unit 216 includes a microprocessor and controls the tuner unit 201, the descrambler 202, the demultiplexer 203, the respective decoders 204–206, the EPG-picture-frame configuration unit 208, the display control unit 209, the DAC 210, the UI-picture-frame configuration unit 211, an IEEE SP 1394 interface 212, and the like, in accordance with the user's operations on the operation unit 214 which has various operation switches for channel selection, turning on the power supply, and the like.

The system control unit 216 also includes a memory (not shown), which stores the memory capacity and the remaining memory capacity of each of the recording apparatus A 104, the recording apparatus B 105, and the recording apparatus C 106.

In the first embodiment, since the recording apparatus B 105 and the recording apparatus C 106 are VCRs capable of exchanging a recording medium, the system control unit 216 reads information relating to the recording capacity and the recorded capacity of a recording medium mounted in each of the recording apparatuses from an identified recording apparatus via the IEEE SP 1394 interface 212, during a recording operation and when a reservation is made to record (to be described later), and stores the read information in the memory within the system control unit 216.

Since the recording apparatus A 104 is an HDD incapable of mounting and detaching a recording medium, the system control unit 216 stores the memory capacity and the recorded capacity of the recording apparatus A 104 in the memory, and rewrites the recorded capacity stored in the memory every time a recording operation or a reservation to record using the recording apparatus A 104 has been executed.

Figure 3:
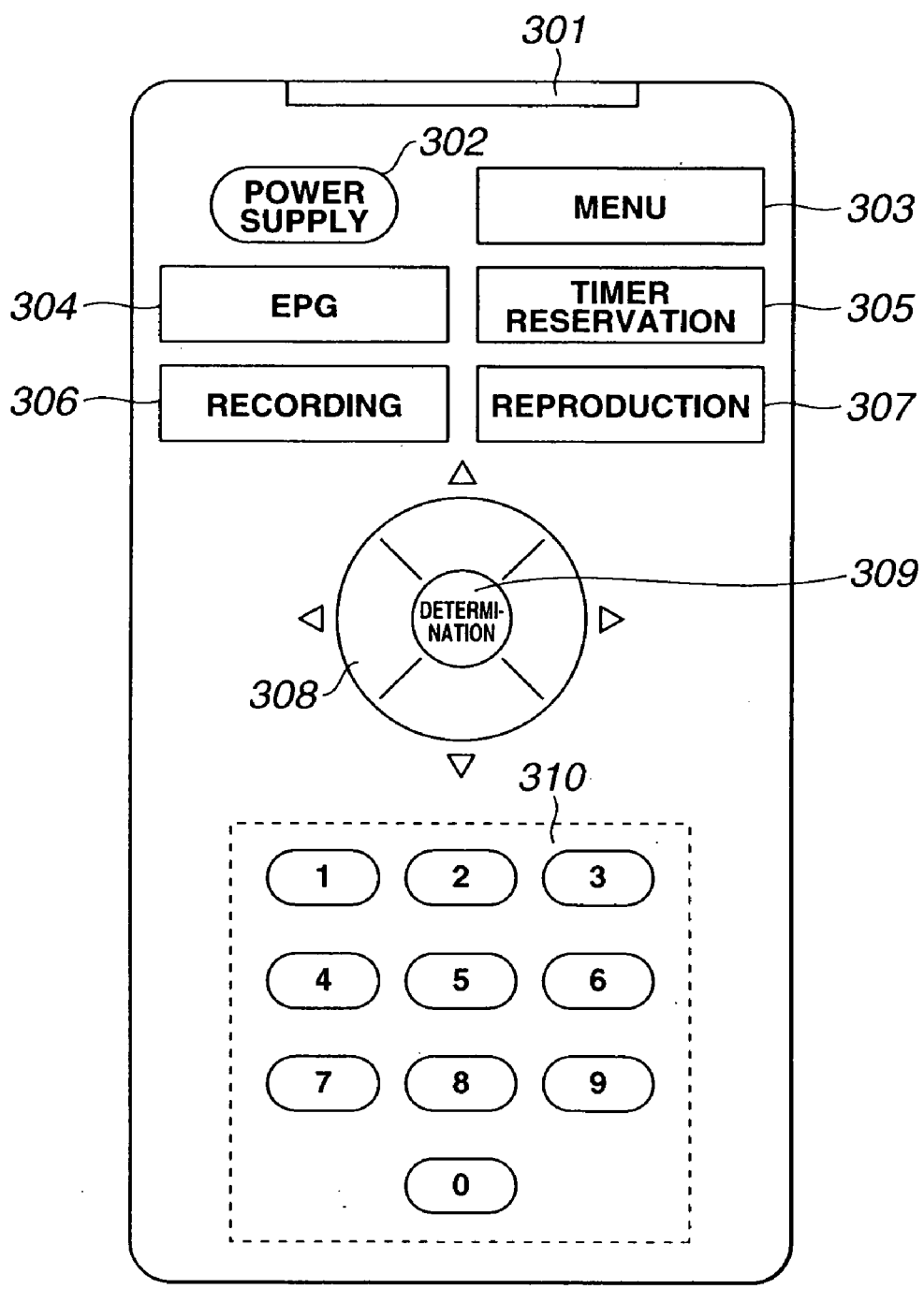
FIG. 3 is a diagram illustrating a remote controller included with an operation unit 214 of the digital TV broadcast receiver shown in FIG. 2.

FIG. 3 illustrates an example of a configuration of a remote controller, which is a part of the operation unit 214. In FIG. 3, only buttons for performing operations necessary for describing the first embodiment are shown, instead of showing all operation buttons necessary for the actual receiver. A pointing device, such as a mouse or the like, may also be used in addition to the buttons shown in FIG. 3.

In FIG. 3, a light-emitting unit 301 is used for performing infrared communication between the remote controller and the photosensing unit provided in the main body of the digital TV broadcast receiver 101. A power-supply button 302 is for turning on/off the power supply of the receiver 101. A menu button 303 is for displaying a menu picture frame displaying a menu of items for setting respective operations, such as switching of the displayed EPG, a change of reservation, and the like. An EPG button 304 is for displaying an EPG picture frame. A timer reservation button 305 is for performing timer reservation. A recording button 306 is for recording a program. A reproduction button 307 is for reproducing program data recorded in the recording apparatus A 104, B 105, C 106, or the like. A cursor button 308 is for moving a selection cursor horizontally or vertically. A determination button 309 is for determining a region selection assigned by the selection cursor 308. A ten-digit keypad 310 is for inputting a channel number.

Next, a description will be provided of operations occurring when recording program data received by the digital TV broadcast receiver 101.

First, operations occurring after depressing the recording button 306 on the operation unit 214 while viewing a program will be described.

Figure 4:
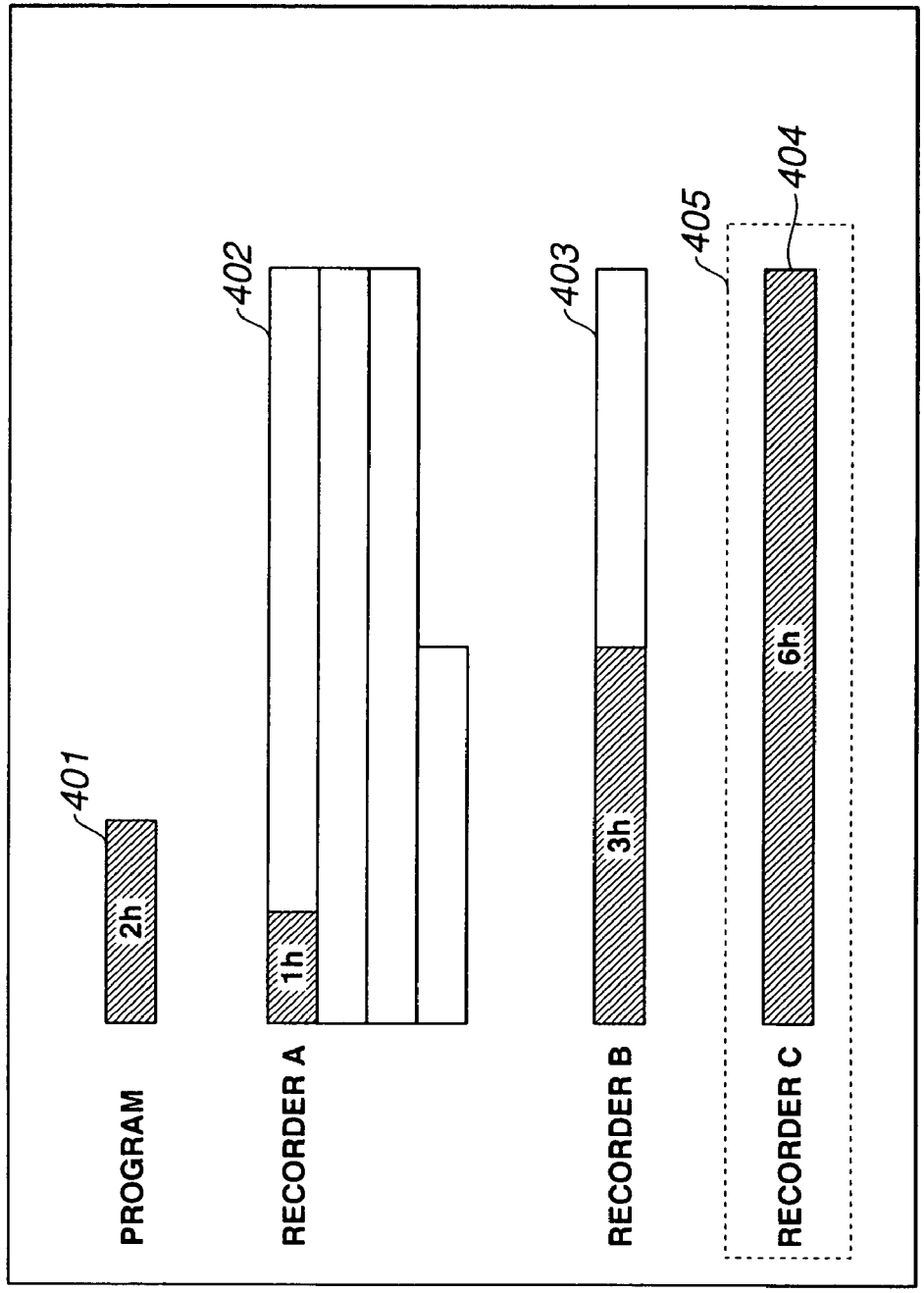
FIG. 4 is a diagram illustrating a picture frame for displaying a remaining memory capacity in the first embodiment.

In response to depression of the recording button 306 on the operation unit 214, the system control unit 216 calculates a recording time period required for recording by comparing the broadcast end time of the program being viewed with the current time, reads the memory capacity and the remaining memory capacity of each recording apparatus stored in the memory within the system control unit 216, as described above, and controls the UI-picture-frame configuration unit 211 so as to form a picture frame for displaying the remaining memory capacity, as shown in FIG. 4, based on the read data.

Then, the system control unit 216 compares the remaining memory capacity of a selected recording apparatus with the memory capacity required for recording the program, in accordance with selection of the recording apparatus on the picture frame displaying the remaining memory capacity by the user's operation on the operation unit 214. If the remaining memory capacity is sufficient, the UI-picture-frame configuration unit 211 and the display control unit 209 are controlled so as to end display of the picture frame indicating the remaining memory capacity and to start recording in the selected recording apparatus for a predetermined time period. Recording of the program being viewed is started in the selected recording apparatus.

Program data to be recorded in the recording apparatus is output to the selected recording apparatus via the tuner unit 201, the descrambler 202, the demultiplexer 203, and the IEEE SP 1394 interface 212. That is, after extracting program data of the program to be recorded from the TS data, recording in the recording apparatus is performed without performing decoding processing.

In addition, recorded-program data, such as the title of the program, the time and date of recording, the recording address, and the like, of the program recorded in each recording apparatus is stored in the memory provided in the system control unit 216. At that time, information relating to the contents recorded in each recording apparatus where a recording medium is detachably mountable is recorded separately for each recording medium.

If the remaining memory capacity is insufficient, the UI-picture-frame configuration unit 211 and the display control unit 209 are controlled so as to display the fact that the remaining memory capacity of the selected recording apparatus is smaller than the memory capacity required for recording the program for a predetermined time period, and again display the picture frame indicating the remaining memory capacity.

The picture frame indicating the remaining memory capacity shown in FIG. 4 will now be described.

An indicator 401 shows a scale indicating the recording time period of the program to be recorded and the numerical value of the recording time in an overlayed state. An indicator 402 shows a scale indicating the ratio of the writable memory capacity (the remaining memory capacity) and the unwritable memory capacity to the total memory capacity of the recording apparatus A 104, which is displayed as a full scale, and the numerical value of the writable time period in an overlayed state.

The system control unit 216 calculates the writable time period by dividing the writable memory capacity by the average transmission speed (bit rate) of the TS data. Since the amount of transmitted data differs between programs having small differences among frame images, such as a news program, and the like, and programs having large differences among frame images, such as a relay program of a soccer game, and the like, the writable time period changes in accordance with a change in the recorded program.

When a high-picture-quality mode, a highlight recording mode, and the like, are present, the amount of recorded data changes in accordance with a predetermined recording condition, and the writable time period changes in accordance with the set mode. The recording condition can be set on a picture frame (not shown) in accordance with a standard mode or a triple recording mode when performing recording in a VCR, or a high-picture-quality mode, a standard mode, or the like, when performing recording in a HDD.

An indicator 403 shows a scale indicating the ratio of the writable memory capacity and the unwritable memory capacity to the total memory capacity of the recording apparatus B 105, which is displayed as a full scale, and the numerical value of the writable time period in an overlayed state. An indicator 404 displays a scale indicating the ratio of the writable memory capacity and the unwritable memory capacity to the total memory capacity of the recording apparatus C 106, which is displayed as a full scale, and the numerical value of the writable time period in an overlayed state. A selection cursor 405 is used for selecting a recording apparatus.

In FIG. 4, the hatched portion of the indicator for each recording apparatus represents the writable memory capacity, and the white portion represents the unwritable memory capacity.

That is, the indicator 402 for the recording apparatus A 104 indicates a state in which most of the memory capacity is in a write-inhibit state such that the writable time period is shorter than the recording time of the program to be recorded. The indicator 403 for the recording apparatus B 105 indicates a state in which, although about half the memory capacity is in a write-inhibit state, the writable time period is longer than the recording time of the program to be recorded. The indicator 404 of the recording apparatus C 106 indicates a state in which most of the memory capacity is in a writable state.

Next, operations after depressing the timer reservation button 305 on the operation unit 214 while viewing a program will be described.

The system control unit 216 controls the UI-picture-frame configuration unit 211 and the display control unit 209 so as to display a picture frame for setting a timer reservation (not shown) to select a program to be subjected to timer reservation, in accordance with depression of the timer reservation button 305 on the operation unit 214. The system control unit 216 also controls the respective units so as to display a picture frame indicating the remaining memory capacity in the above-described manner, in accordance with depression of the determination button 309 after inputting the time and date, the channel, and the like, of a program to be subjected to timer reservation on the picture frame for setting a timer reservation.

Then, the system control unit 216 compares the remaining memory capacity of the selected recording apparatus with the memory capacity required for recording the program, in accordance with the selection of a recording apparatus on the picture frame indicating the remaining memory capacity by the user's operation on the operation unit 214. If the remaining memory capacity is sufficient, the UI-picture-frame configuration unit 211 and the display control unit 209 are controlled so as to end the display of the picture frame indicating the remaining memory capacity, and display the fact that timer recording has been set in the selected recording apparatus for a predetermined time period. At the same time, program information relating to the set time and date to start recording, the program to be recorded, and the like, is output to the memory provided in the system control unit 216, and monitoring whether or not the time and date to start recording has come is performed.

If the remaining memory capacity is insufficient, the UI-picture-frame configuration unit 211 and the display control unit 209 are controlled so as to display the fact that the remaining memory capacity of the selected recording apparatus is smaller than the memory capacity required for recording the program for a predetermined time period, and again display the picture frame indicating the remaining memory capacity.

It is also possible to perform setting of a reservation by selecting a desired program using the selection cursor 405 on an EPG picture frame being displayed, and depressing the timer reservation button 305. On the picture frame for setting timer reservation, it is possible not only to input the time and date of broadcast, the channel, and the like, of a program to be reserved, but also to provide an instruction for displaying an EPG picture frame.

Next, operations that occur when reproducing program data recorded in each recording apparatus will be described.

The system control unit 216 controls the UI-picture-frame configuration unit 211 and the display control unit 209 so as to display a picture frame indicating a summary of recorded programs (not shown) based on recording-program data stored in the memory, as described above, in accordance with depression of the reproduction button 307 by the user's operation on the operation unit 214.

On the picture frame indicating the summary of recorded programs, each recorded program can be selected and determined by the user's operation on the operation unit 214. The system control unit 216 reads program data from the recording apparatus in which the assigned program is recorded, in accordance with selection and determination of the recorded program by the user's operation on the operation unit 214.

The read image data is output to the monitor 103 via the IEEE SP 1394 interface 212, the video decoder 204, and the display control unit 209.

Sound data read from the recording apparatus is output to the monitor 103 via the IEEE SP 1394 interface 212, the audio decoder 205, and the DAC 210.

As described above, in the first embodiment, when recording program data in a plurality of recording apparatuses, the user is allowed to clearly recognize the recording capacity and the recordable capacity of each recording apparatus. Hence, it is possible to easily find a recording apparatus that is most suitable for recording the identified program data, and to efficiently use recording regions of each recording medium.

Although, in the first embodiment, a summary of information relating to the remaining memory capacity of each recording apparatus is displayed, and the user selects and determines a recording apparatus in which recording is to be performed by referring to the display of the summary, a recording apparatus in which recording is to be performed may be automatically selected.

At that time, the priority orders of recording apparatuses may be set in advance, and a recording apparatus having the highest priority order may be automatically selected from among recording apparatuses having remaining capacities sufficient for recording program data. For example, when a plurality of HDDs are connected and a plurality of HDDs having remaining capacities sufficient for recording program data are present, efficient recording may be realized by selecting a HDD having the smallest sufficient empty capacity.

When assigning apparatuses for recording of programs, the number of selected recording apparatuses is not limited to one, but a plurality of recording apparatuses may be selected.

Although, in the first embodiment, when recording a program, program data of the assigned program is extracted from the TS data and the extracted program data is recorded, the entire TS data may be recorded.

Although, in the first embodiment, the digital TV broadcast receiver does not include a display unit, the digital TV broadcast receiver may include a display unit.

Although in the first embodiment, the respective recording apparatuses and the digital TV broadcast receiver are externally connected, a configuration in which the digital TV broadcast receiver includes a plurality of recording apparatuses, such as HDDs, or the like, may be adopted.

Next, a second embodiment of the present invention will be described in detail.

A program-data recording/reproducing system according to the second embodiment has the same configuration as that of the program-data recording/reproducing system according to the first embodiment, except for the following points. The same components as those in the first embodiment are indicated by the same reference numerals, and further description thereof will be omitted.

The second embodiment differs from the first embodiment in that the genre of a program to be recorded can be set for each recording apparatus or each recording medium, and program data is recorded by determining a recording apparatus or a recording medium for each of the set genres.

First, a description will be provided of a genre-setting picture frame for setting a genre for each recording apparatus. The genre-setting picture frame can be displayed from a menu picture frame displayed by depressing the menu button 303 shown in FIG. 3.

FIG. 5 illustrates an example of display on the genre-setting picture frame. In FIG. 5, there are shown a genre setting indicator 501 for the recording apparatus A 104, a genre setting indicator 502 for a recording medium B mounted in the recording apparatus B 105, a genre setting indicator 503 for a recording medium C mounted in the recording apparatus C 106, and a pull-down-menu button 504 of the indicator 503.

In FIG. 5, a genre "others", a genre "music", and a genre "sports" are set in the indicators 501, 502, and 503, respectively.

When changing a genre setting for each recording apparatus (or each recording medium), for example, when changing the indicator 503 by pressing the pull-down-menu button 504 by the user's operation on the operation unit 214, a pull-down menu is displayed, as shown in FIG. 5, and a genre can be selected and set by selection and determination using the selection cursor 405.

Genre information set in the above-described manner is stored in the memory provided in the system control unit 216 so as to correspond to each recording apparatus (or each recording medium). In the memory, data relating to each program, such as the title, the time and date of recording, the recording address, and the like, of the program, recorded in each recording apparatus (or each recording medium), and capacity data, such as the recorded capacity and the like, are also recorded so as to correspond to each recording apparatus (or each recording medium).

Next, operations that occur when recording program data received by the digital TV broadcast receiver 101 will be described.

When an instruction to record a program has been input from the operation unit 214 by depressing the recording button 306 or the timer reservation button 305, shown in FIG. 3, the system control unit 216 reads genre information of the program instructed to be recorded from EPG data recorded in the EPG memory 207.

For a recording apparatus in which a recording medium is detachably mountable, information relating to the recorded contents of the recording medium mounted in the recording apparatus is read via the IEEE SP 1394 interface 212, and the recording medium is specified by comparing the read information with information relating to the recorded contents recorded in the above-described memory. Then, genre information set in the recording medium is read. For a recording medium where genre information is not stored, an operation to set a genre is performed by displaying the above-described genre-setting picture frame.

By comparing the genre information of the program instructed to be recorded, which has been read from the EPG memory, with genre information set in each recording apparatus (or each recording medium) stored in the memory in the above-described manner, a recording apparatus having a coincident genre or a recording apparatus in which a recording medium having a coincident genre is mounted is discriminated. Start of recording or setting of timer recording is performed for the recording apparatus which has been discriminated in the above-described manner.

For example, in the case shown in FIG. 5, if the genre of a program instructed to be recorded is "music", recording is performed in the recording apparatus B 105. If the genre of a program instructed to be recorded is "sports", recording is performed in the recording apparatus C 106. If the genre of a program instructed to be recorded is "others", recording is performed in the recording apparatus A 104.

When the genre "others" is set in none of the genre setting indicators 501, 502, and 503, and a program instructed to be recorded belongs to none of the set genres, the system control unit 216 controls the UI-picture-frame configuration unit 211 and the display control unit 209 so as to display an instruction picture frame (not shown) for causing the user to instruct as to which recording apparatus recording is to be performed. Start of recording or setting of timer recording is performed for a recording apparatus instructed on the instruction picture frame.

When determining a recording apparatus based on genre information in the above-described manner, the remaining memory capacity of the recording apparatus determined to have coincident genre information is read from the memory provided in the system control unit 216, and, as described in the first embodiment, the recording time period of the program to be recorded is compared with the writable time period.

If the remaining memory capacity is insufficient for recording, then, after displaying that fact for a predetermined time period, the genre-setting picture frame shown in FIG. 5 is displayed. A desired recording apparatus can be selected and determined by moving a selection cursor (not shown) by the user's manual operation. It is also possible to change a genre setting for a recording apparatus on the genre-setting picture frame.

When reproducing program data, a correspondence table between respective recording apparatuses (or respective recording media) and set genres is displayed. In program retrieval to retrieve a program recorded in a recording apparatus, the above-described correspondence table is also displayed. When a genre is set as the retrieval condition in the program retrieval, retrieval is performed by comparing the genre set as the retrieval condition with a genre set in each recording apparatus.

When retrieving a recorded program, the system control unit 216 performs processing to retrieve a program corresponding to the retrieval condition based on recorded-program data stored in the memory of the system control unit 216.

As described above, in the second embodiment, when recording program data in a plurality of recording apparatuses, a genre is set for each recording apparatus, or each recording medium mounted in each recording apparatus, and program data is recorded separately for each genre. Hence, when reproducing program data, it is possible to easily find desired program data from among recorded program data, and promptly retrieve desired program data.

In the second embodiment, since a genre of program data to be recorded is set for a recording medium that is detachably mountable in a recording apparatus, it is possible to record program data separately for the genre of each recording medium, and to realize the effect of easily managing program data.

When assigning recording of a program, the number of selected recording apparatuses is not limited to one, but a plurality of recording apparatuses may be selected.

Although, in the second embodiment, when recording a program, program data of the assigned program is extracted from TS data and the extracted program data is recorded, the entire TS data may be recorded.

Although, in the second embodiment, the digital TV broadcast receiver does not include a display unit, the digital TV broadcast receiver may include a display unit.

Although, in the second embodiment, the respective recording apparatuses and the digital TV broadcast receiver are externally connected, a configuration in which the digital TV broadcast receiver includes a plurality of recording apparatuses, such as HDDs, or the like, may be adopted.

Next, a third embodiment of the present invention will be described in detail.

A program-data recording/reproducing system according to the third embodiment has the same configuration as that of the program-data recording/reproducing system according to the first and second embodiments, except for the following points. The same components as those in the first and second embodiments are indicated by the same reference numerals, and further description thereof will be omitted.

The third embodiment differs from the first and second embodiments in that a user can be set for each recording apparatus, and that only a user set for each recording apparatus can instruct recording/reproducing processing.

First, a description will be provided of a user-setting picture frame for allowing a user set for each recording apparatus to instruct recording/reproducing processing.

FIG. 6 illustrates an example of a display of a user-setting picture frame. In FIG. 6, a region 601 indicates the name of a user set in the recording apparatus A 104. A region 602 is for inputting the ID of the user set in the recording apparatus A 104. A region 603 indicates the name of a user set in the recording apparatus B 105. A region 604 is for inputting the ID of the user set in the recording apparatus B 105. A region 605 indicates the name of a user set in the recording apparatus C 106. A region 606 is for inputting the ID of the user set in the recording apparatus C 106. A region 607 represents a selection cursor for selecting a recording apparatus to which input of data is to be set.

FIG. 6 illustrates a state in which a user is not set in the recording apparatus A 104, a state in which a user name "papa" is set in the recording apparatus B 105, and a state in which a user name "mama" is set in the recording apparatus C 106.

In the states of setting shown in FIG. 6, the recording apparatus A 104 can be operated by anybody by performing an operation on the operation unit 214 of the digital TV broadcast receiver 101. On the other hand, processing, such as recording, reproduction, or the like, can be performed for the recording apparatus B 105 and the recording apparatus C 106 by inputting the user ID for "papa" and the user ID for "mama", respectively.

A case of changing a user setting will now be described. First, the user-setting picture frame shown in FIG. 6 is displayed by selecting an item "change of user setting" from a menu picture frame displayed by depressing the menu button 303 shown in FIG. 3.

On the user-setting picture frame thus displayed, by moving the selection cursor 607 by depressing the cursor button 308 on the operation unit 214 and then depressing the determination button 309, a recording apparatus for which setting is to be changed is selected and determined. The setting region of the selected and determined recording apparatus is subjected to highlight display, to provide a state in which a user ID can be input.

By inputting a user ID corresponding to the user name currently set in the assigned recording apparatus, a user-setting-changing picture frame (not shown) is displayed, and a new user name and user ID can be set.

When performing processing of inputting characters, the system control unit 216 displays character input keys (not shown) on the monitor 103, and controls respective units so as to input characters by selecting and determining each character input key by operating the cursor button 308 and the determination button 309 on the operation unit 214.

Information relating to the set user name and user ID is stored in the memory provided in the system control unit 216 so as to correspond to each recording apparatus.

Next, a description will be provided of operations that occur when recording program data received by the digital TV broadcast receiver 101.

When an instruction to record a program has been input from the operation unit 214 by depressing the recording button 306 or the timer reservation button 305, shown in FIG. 3, the system control unit 216 controls the UI-picture-frame configuration unit 211 and the display control unit 209 so as to display the user-setting picture frame shown in FIG. 6.

On the user-setting picture frame thus displayed, by moving the selection cursor 607 by depressing the cursor button 308 on the operation unit 214 and then depressing the determination button 309, the recording apparatus for which setting is to be changed is selected and determined. The setting region of the selected and determined recording apparatus is subjected to highlight display, to provide a state in which a user ID can be input.

In accordance with input of a user ID corresponding to the user set for the recording apparatus assigned by an operation on the operation unit 214, the system control unit 216 compares the input user ID with a user ID corresponding to the user name stored in the memory in the above-described manner. When the two user IDs coincide, start of recording or permission to set timer recording is allowed for the assigned recording apparatus.

A description will now be provided of operations that occur when reproducing program data recorded in each recording apparatus.

When an instruction to reproduce a program is input from the operation unit 214 by depressing the reproduction button 307 shown in FIG. 3, the system control unit 216 controls the UI-picture-frame configuration unit 211 and the display control unit 209 so as to display the user-setting picture frame shown in FIG. 6.

On the user-setting picture frame thus displayed, by performing a user setting operation in the same manner as when recording a program, permission to reproduce program data recorded in the assigned recording apparatus is allowed.

Similarly, when deleting program data recorded in each recording apparatus, by displaying the user-setting picture frame and performing a user setting operation, permission to delete program data recorded in the assigned recording apparatus is allowed.

As described above, in the third embodiment, when program data is recorded in a plurality of recording apparatuses, and a plurality of users share a common program recording system, a user can be set for each recording apparatus, and only the user set for a particular recording apparatus can instruct processing, such as recording, reproduction, and the like, for that purpose. Hence, unexpected erasure of program data or recording of unnecessary program data by another user is prevented, and each user can use a separate recording apparatus.

Although, in the third embodiment, a set user ID is recognized by inputting a password, the method for recognizing a user ID is not limited to such an approach. For example, a user ID may be automatically recognized by voice recognition, or the like.

When assigning recording of a program, the number of selected recording apparatuses is not limited to one, but a plurality of recording apparatuses may be selected.

Although, in the third embodiment, when recording a program, program data of the assigned program is extracted and recorded from among TS data, the entire TS data may be recorded.

Although, in the third embodiment, the digital TV broadcast receiver does not include a display unit, the digital TV broadcast receiver may include a display unit.

Although, in the third embodiment, respective recording apparatuses and the digital TV broadcast receiver are externally connected, a configuration in which the digital TV broadcast receiver includes a plurality of recording apparatuses, such as HDDs, or the like, may be adopted.

As described in the second embodiment, a genre of programs to be recorded may be set in each recording apparatus or recording medium for each user, and a recording apparatus (or a recording medium) may be selected in accordance with the genre of a program instructed to be recorded after recognition of a user ID.

As described above, according to the present invention, it is possible to efficiently manage recorded programs when recording program data relating to a plurality of programs in a plurality of recording apparatuses, and to easily find an optimum recording region for recording the program data. Accordingly, it is possible to efficiently use recording regions of a plurality of recording media.

In a program recording/reproducing system in which a plurality of recording apparatuses are connected, desired program data can be easily retrieved from among recorded program data.

When program data relating to a plurality of programs are recorded in a plurality of recording apparatuses and a plurality of users use a common program recording system, each user can instruct processing, such as reproduction, deletion, or the like, of program data, and clearly instruct an operation for recording or reproducing a program as when only the user uses the system.

The individual components shown in outline or designated by blocks in the drawings are all well known in the television signal receiver arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A television signal receiver connected to a plurality of recording apparatuses, which record program data received by said television signal receiver, said television signal receiver comprising:
   an input unit adapted to input program data;
   an identification unit adapted to identify a genre to which the program data inputted by said input unit belongs;
   an allocation unit adapted to allocate genre information to each of the plurality of recording apparatuses;
   a selection unit adapted to select a recording apparatus from among the plurality of recording apparatuses in accordance with the genre identified by said identification unit, wherein said selection unit selects the recording apparatus in accordance with the genre information allocated by said allocation unit and the genre of the program data identified by said identification unit; and
   an output unit adapted to output the program data to the recording apparatus selected by said selection unit.

2. A television signal receiver according to claim 1, wherein the plurality of recording apparatuses are externally connected to said television signal receiver.

3. A television signal receiver according to claim 1, wherein, when the genre identified by said identification unit coincides with none of the genre information allocated to the plurality of recording apparatuses by said allocation unit, a user employs said selection unit manually to select the recording apparatus from among the plurality of recording apparatuses.

4. A television signal receiver according to claim 1, further comprising a discrimination unit adapted to discriminate a respective recording medium mounted in each of the plurality of recording apparatuses, wherein said allocation unit allocates genre information to each recording medium mounted in the plurality of recording apparatuses, and wherein said selection unit selects a recording apparatus mounting the recording medium discriminated by said discrimination unit, in accordance with the genre information allocated to the recording medium and the genre of the program data identified by said identification unit.

5. A television signal receiver according to claim 1, wherein said identification unit identifies the genre of the program based on EPG (electronic program guide) data in the program data inputted by said input unit.

6. A recording control method of controlling a plurality of recording apparatuses, which record program data received by a television signal receiver, said method comprising:
an input step of inputting program data;
an identification step of identifying a genre to which the inputted program data belongs;
an allocation step of allocating genre information to each of the plurality of recording apparatuses;
a selection step of selecting a recording apparatus from among the plurality of recording apparatuses in accordance with the identified group, wherein, in said selection step, the recording apparatus is selected in accordance with the genre information allocated in said allocation step and the genre of the program data identified in said identification step; and
an output step of outputting the program data to the selected recording apparatus.

7. A recording control method according to claim 6, wherein the plurality of recording apparatuses are externally connected to the television signal receiver.

8. A recording control method according to claim 6, wherein, when the genre identified in said identification step coincides with none of the genre information allocated to the plurality of recording apparatuses in said allocation step, the recording apparatus is manually selected from among the plurality of recording apparatuses.

9. A recording control method according to claim 6, further comprising a discrimination step of discriminating a respective recording medium mounted in each of the plurality of recording apparatuses, wherein, in said allocation step, genre information is allocated to each recording medium mounted in the plurality of recording apparatuses, and wherein, in said selection step, a recording apparatus mounting the recording medium discriminated in said discrimination step is selected, in accordance with the genre information allocated to the recording medium and the genre of the program data identified in said identification step.

10. A recording control method according to claim 6, wherein, in said identification step, the genre of the program is identified based on EPG data in the program data inputted in said input step.

11. A television signal receiver connected to a plurality of recording apparatuses, which record program data received by said television signal receiver, said television signal receiver comprising:

a setting unit adapted to set user information for each of the plurality of recording apparatuses;
a control unit adapted to control each of the plurality of recording apparatuses so as to allow a user corresponding to the user information set by said setting unit to instruct processing relating to a corresponding recording apparatus;
an instruction unit adapted to instruct processing for each of the plurality of recording apparatuses; and
a determination unit adapted to determine whether or not the processing instructed by said instruction unit is from a user corresponding to the user information set by said setting unit,
wherein said control unit controls the corresponding recording apparatus to perform the instructed processing when said determination unit has determined that the processing is instructed from the user corresponding to the set user information.

12. A television signal receiver according to claim 11, wherein the plurality of recording apparatuses are externally connected to said control means.

13. A television signal receiver according to claim 11, wherein said setting unit sets a user name and a user ID to each of the plurality of recording apparatuses, wherein said determination unit comprises an input unit adapted to input a user ID corresponding to the user name, and wherein said control unit controls the corresponding recording apparatus to perform the instructed processing when the user ID corresponding to the set user name coincides with the user ID input by said input unit.

14. A television signal receiver according to claim 11, wherein said setting unit sets a user voice for identifying a user name and a user, wherein said determination unit comprises an input unit adapted to input a user voice corresponding to the user name, and wherein said control unit controls the corresponding recording apparatus to perform the instructed processing when the user voice corresponding to the set user name coincides with the user voice input by said input unit.

15. A recording control method of controlling a plurality of recording apparatuses, which record program data received by a television signal receiver, said method comprising:
a setting step of setting user information for each of the plurality of recording apparatuses;
a control step of controlling each of the plurality of recording apparatuses to allow a user corresponding to the user information set in said setting step to instruct processing relating to a corresponding recording apparatus;
an instruction step of instructing processing for each of the plurality of recording apparatuses; and
a determination step of determining whether or not the processing instructed in said instruction step is from a user corresponding to the user information set in said setting step,
wherein said control step controls the corresponding recording apparatus to perform the instructed processing when the determination step has determined that the processing is instructed from the user corresponding to the set user information.

* * * * *